United States Patent [19]

Tanaka et al.

[11] Patent Number: 4,629,294

[45] Date of Patent: Dec. 16, 1986

[54] ZOOM LENS

[75] Inventors: Tsunefumi Tanaka, Kanagawa; Sadatoshi Takahashi; Nozomu Kitagishi, both of Tokyo; Keiji Ikemori; Kikuo Momiyama, both of Kanagawa, all of Japan

[73] Assignee: Canon Kabushiki Kaisha, Tokyo, Japan

[21] Appl. No.: 622,713

[22] Filed: Jun. 20, 1984

[30] Foreign Application Priority Data

Jul. 4, 1983 [JP] Japan .................. 58-122015

[51] Int. Cl.⁴ .............................. G02B 15/14
[52] U.S. Cl. ................................. 350/427
[58] Field of Search ........................ 350/427

[56] References Cited
U.S. PATENT DOCUMENTS 4,523,814  6/1985  Okudaira .................. 350/427

Primary Examiner—John K. Corbin
Assistant Examiner—Rebecca D. Gass
Attorney, Agent, or Firm—Toren, McGeady, Stanger, Goldberg & Kiel

[57] ABSTRACT

A zoom lens includes, from front to rear, a positive first component, a negative second component, a positive third component and a positive or negative fourth component. The first, third and fourth components are movable to vary the focal length of the entire system. In the wide angle position, the image modification of the third component contributes to the ratio of the focal length of the third component to the focal length of the fourth component, and the ratio of that fraction of the zoom ration of the entire system which the second component assumes to the zoom ratio of the entire system, satisfies specific conditions such that minimization of the bulk and size of the zoom lens and a stabilized correction of aberrations are achieved.

4 Claims, 22 Drawing Figures

WIDE ANGLE

INTERMEDIATE

TELEPHOTO

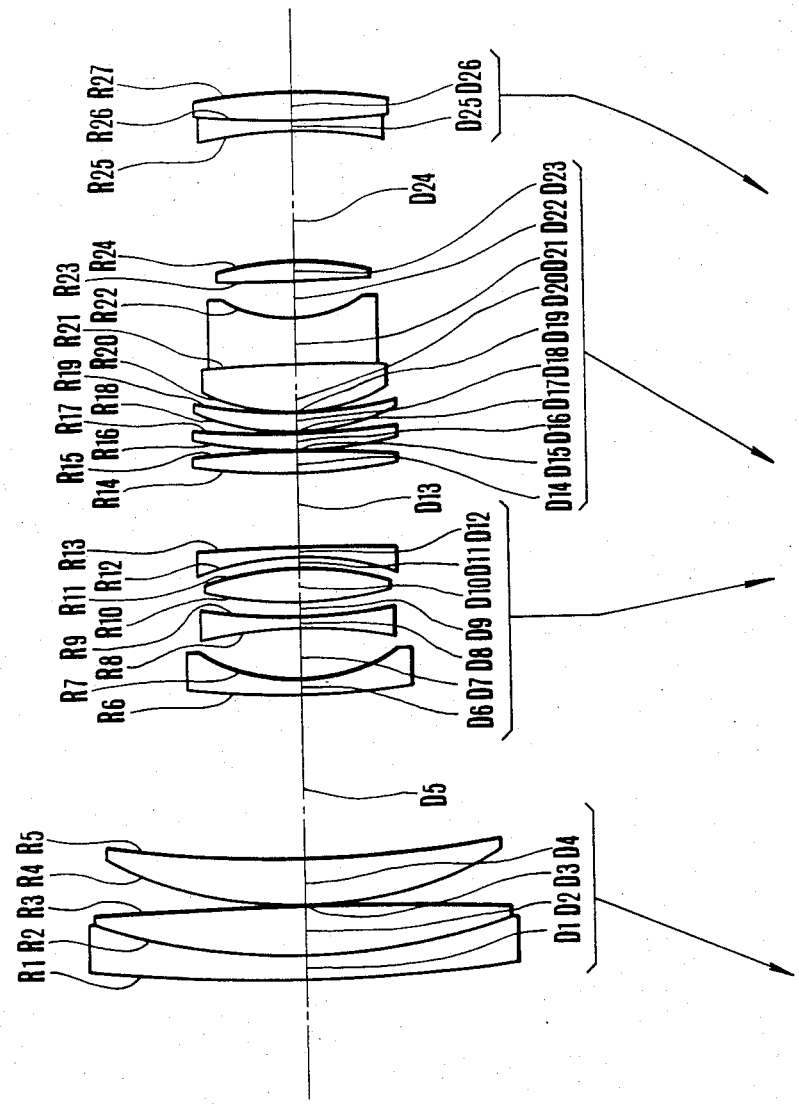

ZOOM LENS

BACKGROUND OF THE INVENTION

1. Field of the Invention

This invention relates to high magnification range compact zoom lenses.

2. Description of the Prior Art

High range zoom lenses are proposed in Japanese Laid-Open Patent Application Nos. SHO 57-161804 (published Oct. 3, 1982) and SHO 571 -192917 (published Nov. 27, 1982). These zoom lenses are constructed with four components, all of which move at different speeds during zooming to extend the lens' range. In particular, imparting a dependent movement into the frontmost or first component assists the magnification varying effect of the second component. This leads to a zoom lens of high range and minimum bulk and size. In the zoom lens of Japanese Laid-Open Patent Application No. SHO 57-161804, however, the third component is positioned farther from the image plane and has a weaker refractive power than the fourth component. The back-focal distance is thus unduly long, and the entire lens system tends to be long in the longitudinal direction. In Japanese Laid-Open Patent Application No. SHO 57-192917, on the other hand, the refractive powers of the third and fourth components are both too strong to allow for achieving good correction of aberrations easily.

SUMMARY OF THE INVENTION

The present invention has an object of providing a zoom lens of shortened longitudinal length while still permitting good correction of aberrations.

Other objects of the invention will become apparent from the following description of embodiments thereof.

BRIEF DESCRIPTION OF THE DRAWINGS

FIG. 7 is a lens block diagram of a third specific numerical example of the lens of the invention.

DETAILED DESCRIPTION OF THE PREFERRED EMBODIMENTS

To achieve the object of the invention, in a zoom lens comprising, from front to rear, a first component of positive power, a second component of negative power, a third component of positive power and a fourth component of positive or negative power, or which at least the first, third and fourth components are moved axially to vary the focal length of the entire system, it is important to satisfy the following conditions.

(1) $-3 < \beta 3W < -0.2$ (2) $-0.35 < f3/f4 < 0.45$ (3) $0.45 < Z2/Z \leq 1$ wherein $\beta 3W$ is the image magnification of the third component in the wide angle position, f3 and f4 are the focal lengths of the third and fourth components respectively, Z is the zoom ratio of the entire system and, Z2 is that fraction of the zoom ratio which the second component assumes.

When condition (1) is not satisfied, the degree of convergence of a ray emerging from the third component is limited. By satisfying this condition, it is possible to shorten the total length of the lens. This is explained with reference to FIGS. 1 and 2.

Figure 1:
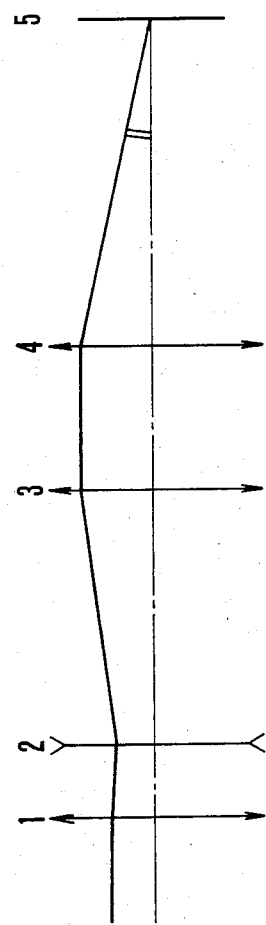
FIG. 1 is a schematic diagram illustrating the power distribution of the components of a prior art zoom lens.
Figure 2:
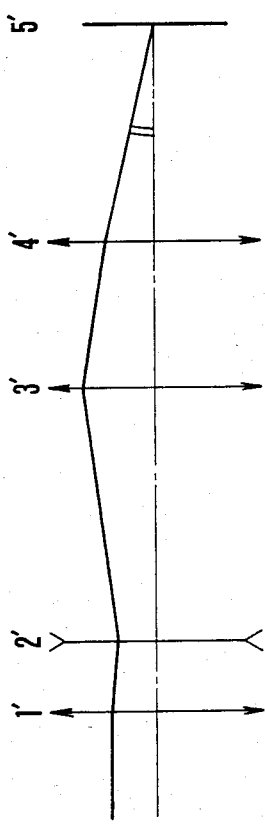
FIG. 2 is similar to FIG. 1 except that the present invention is illustrated.
Figure 3:
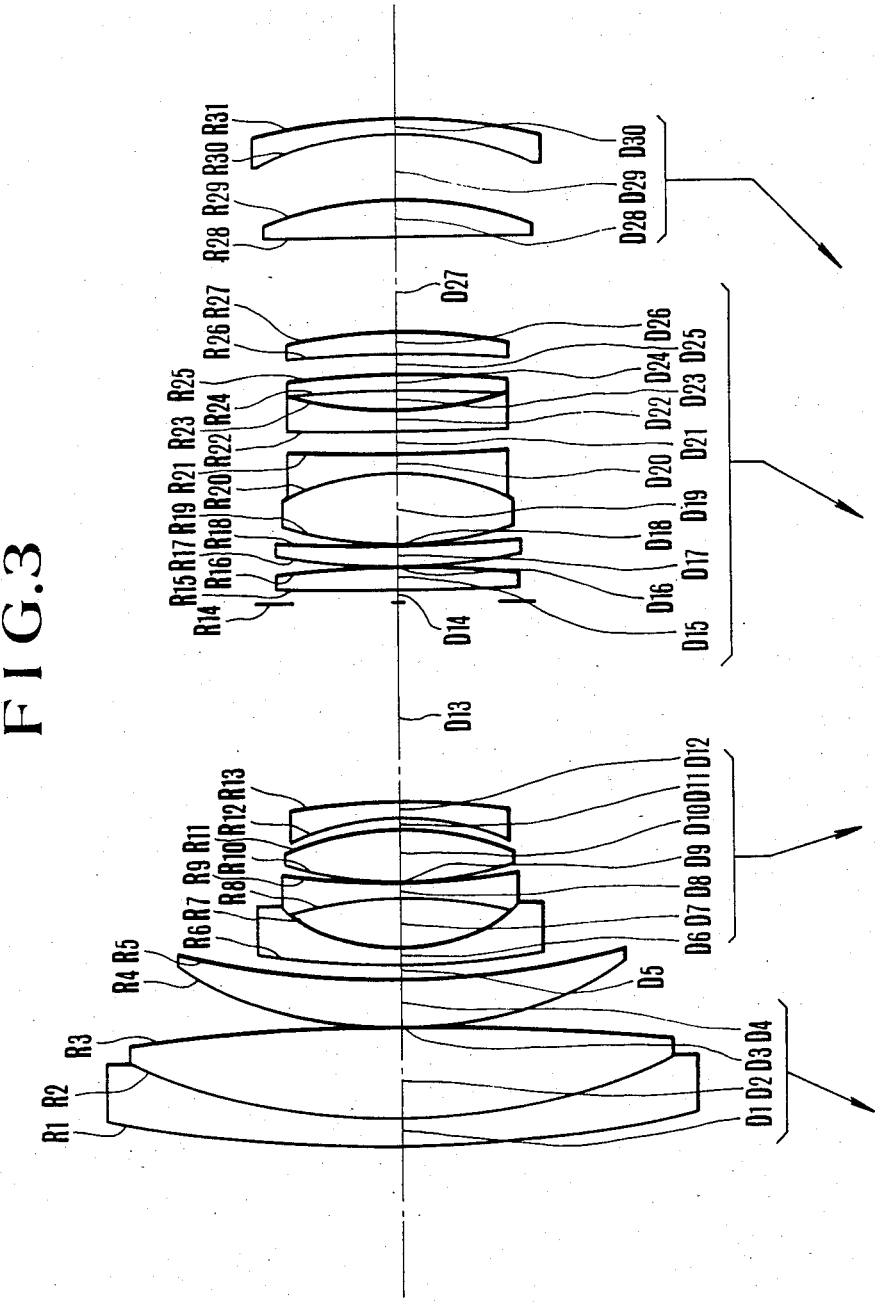
FIG. 3 is a lens block diagram of a first specific numerical example of the lens of the invention.
Figure 4A:
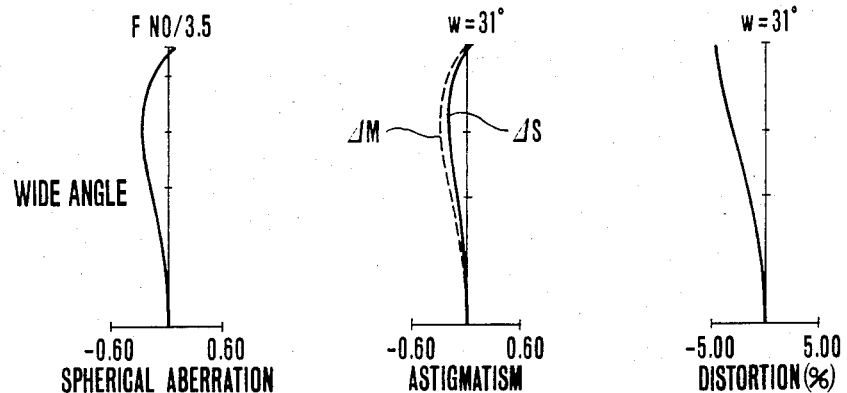
FIGS. 4(a), 4(b) and 4(c) are graphic representations of the various aberrations of the lens of FIG. 3 in the wide angle, intermediate and telephoto positions respectively.
Figure 4B:
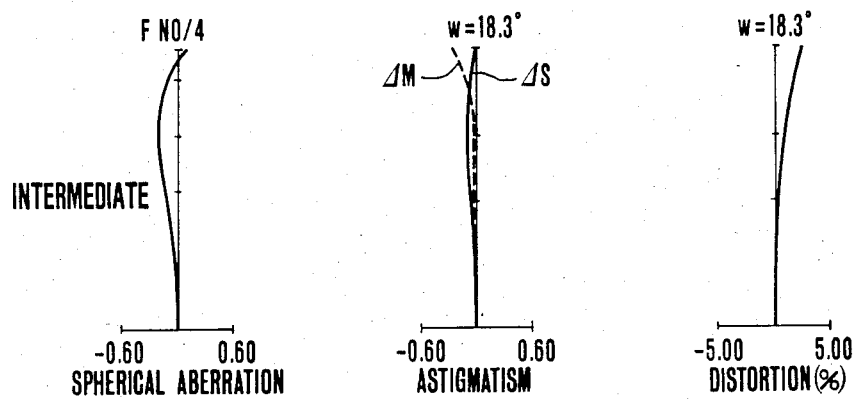
Figure 4C:
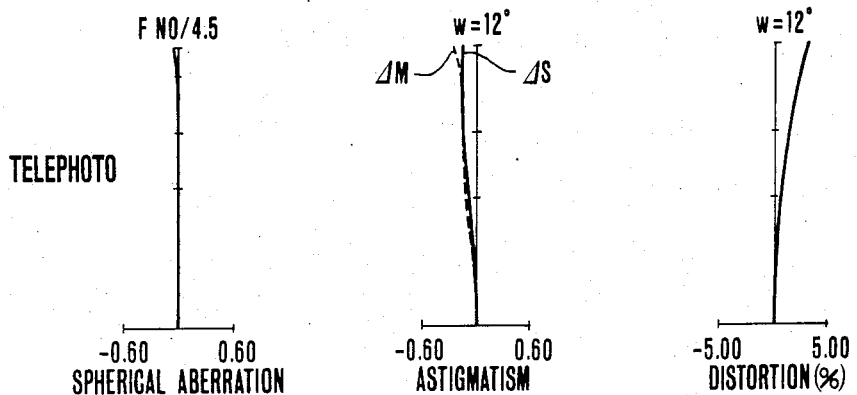
Figure 5:
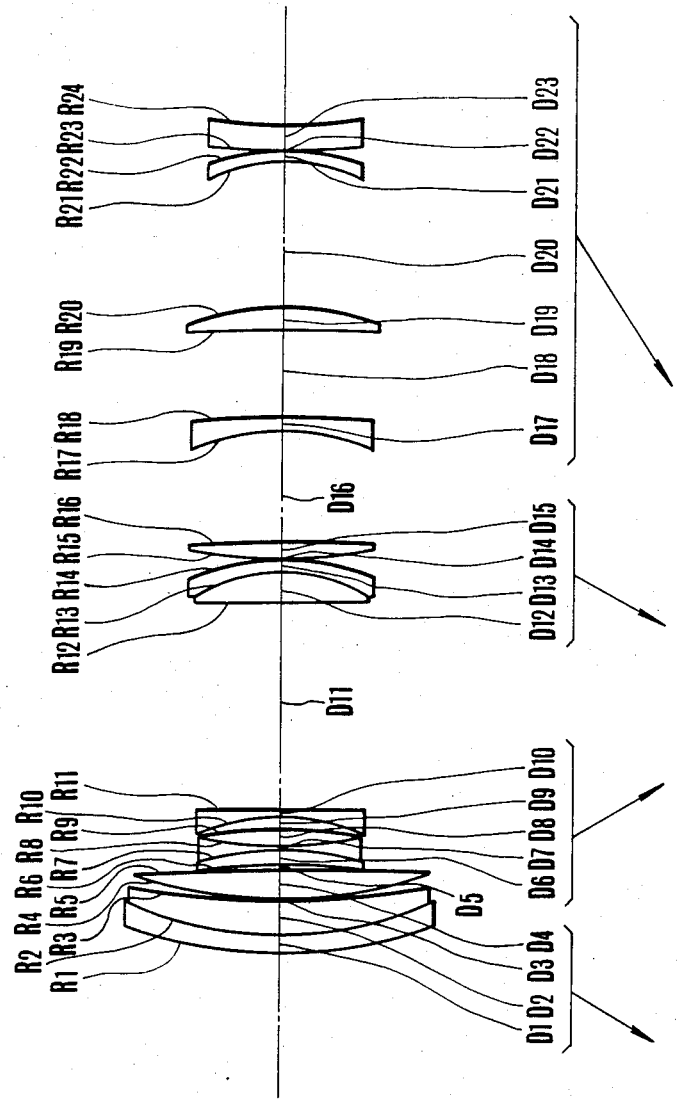
FIG. 5 is a lens block diagram of a second specific numerical example of the lens of the invention.
Figure 6A:
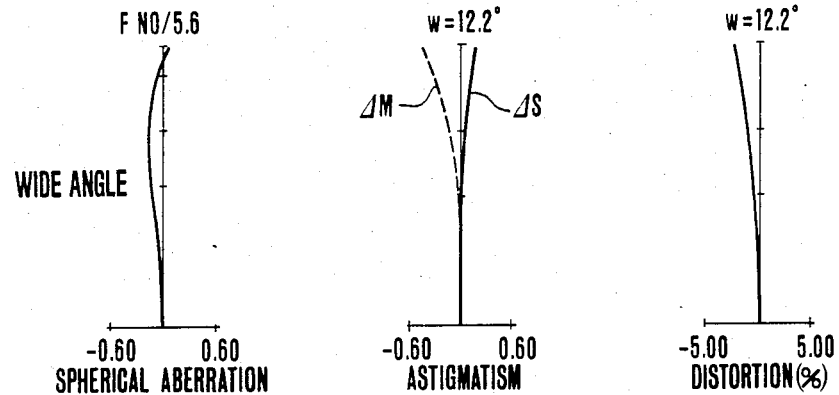
FIGS. 6(a), 6(b) and 6(c) are graphic representations of the various aberrations of the lens of FIG. 5 in the wide angle, intermediate and telephoto positions respectively.
Figure 6B:
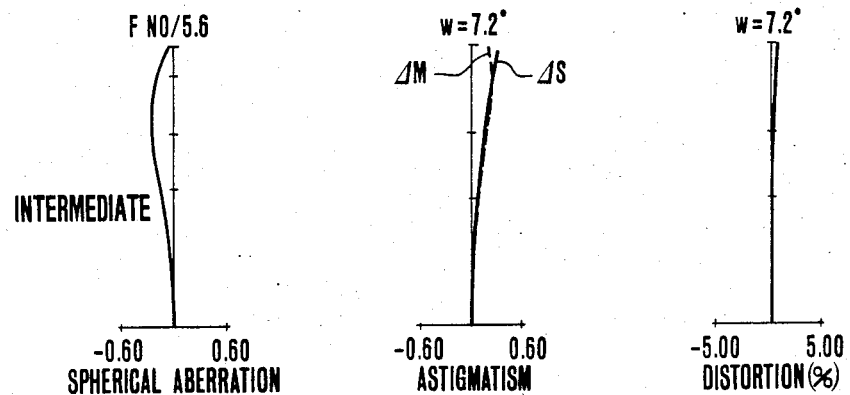
Figure 6C:
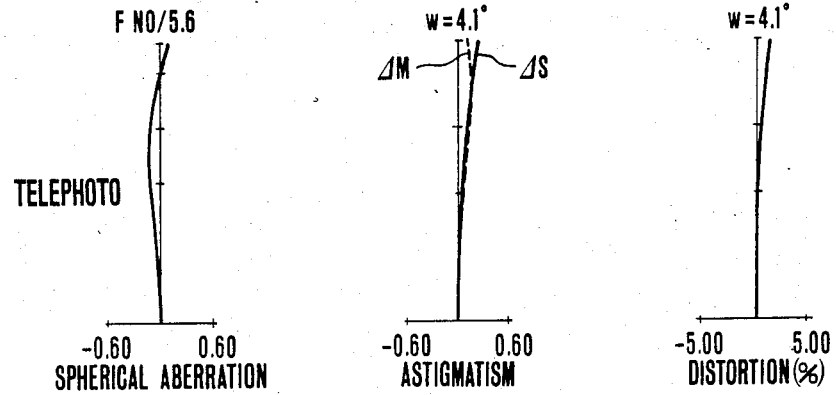
Figure 8A:
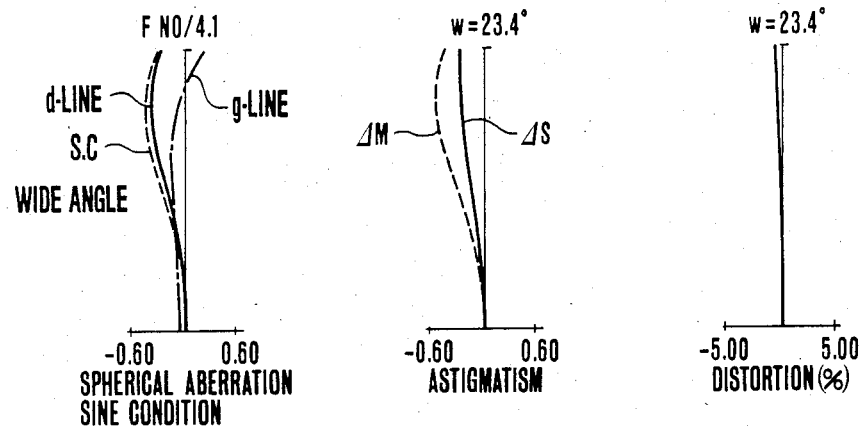
FIGS. 8(a), 8(b) and 8(c) are graphic representations of the various aberrations of the lens of FIG. 7 in the wide angle, intermediate and telephoto positions respectively.
Figure 8B:
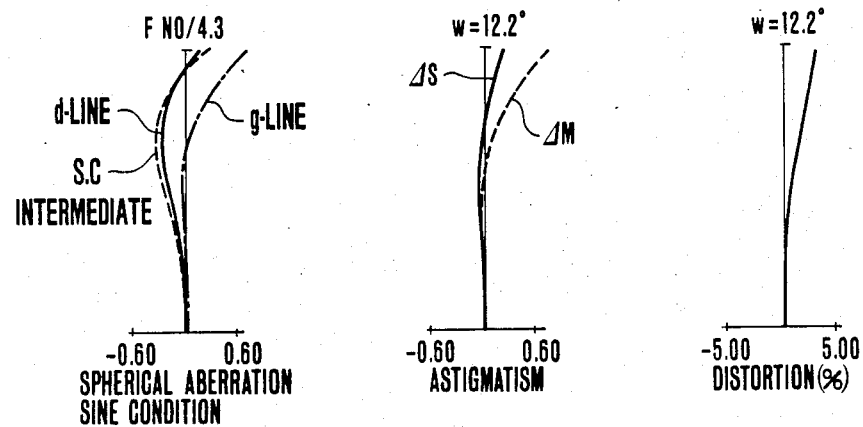
Figure 8C:
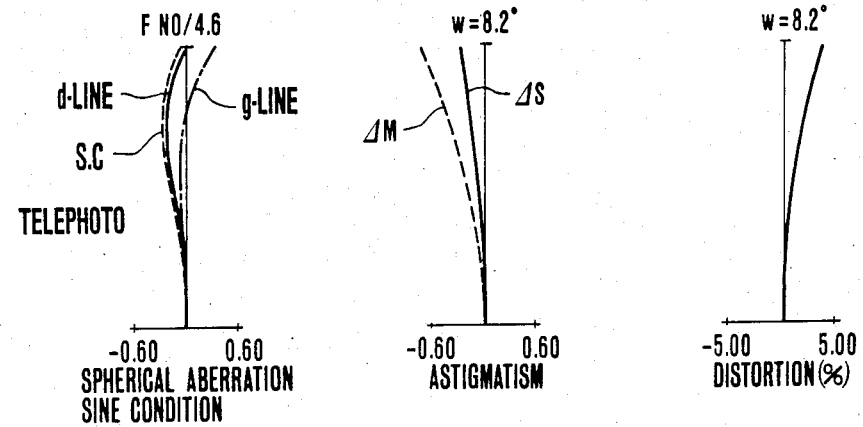
Figure 9:
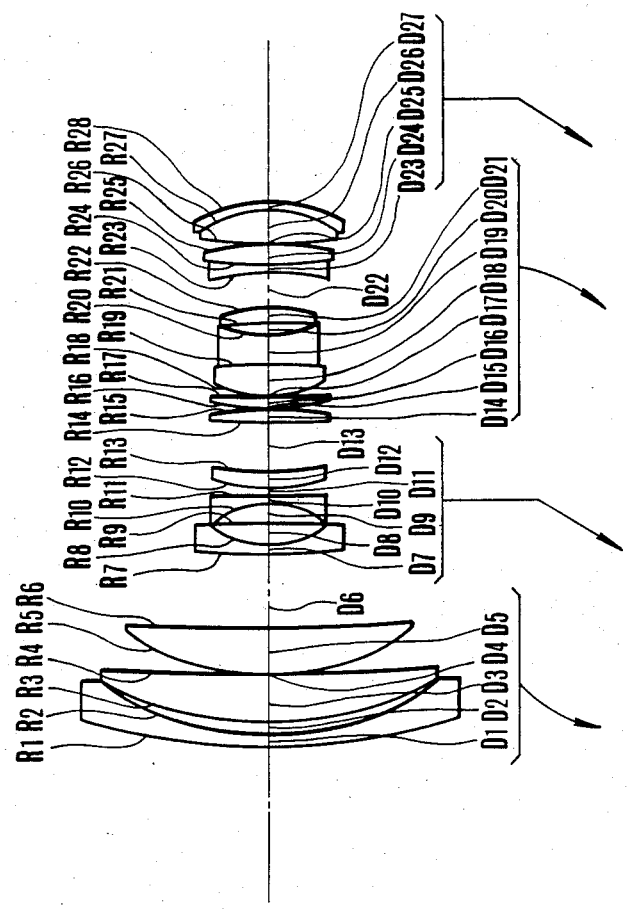
FIG. 9 is a lens block diagram of a fourth specific numerical example of the lens of the invention.
Figure 10A:
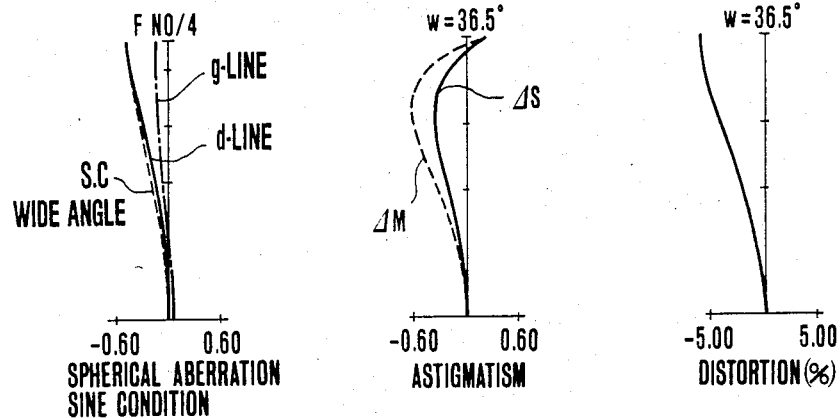
FIGS. 10(a), 10(b) and 10(c) are graphic representations of the various aberrations of the lens of FIG. 9 in the wide angle, intermediate and telephoto positions respectively.
Figure 10B:
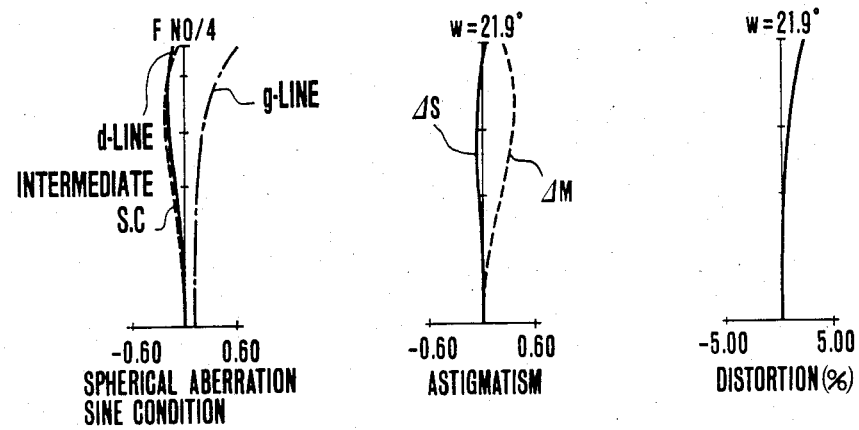
Figure 10C:
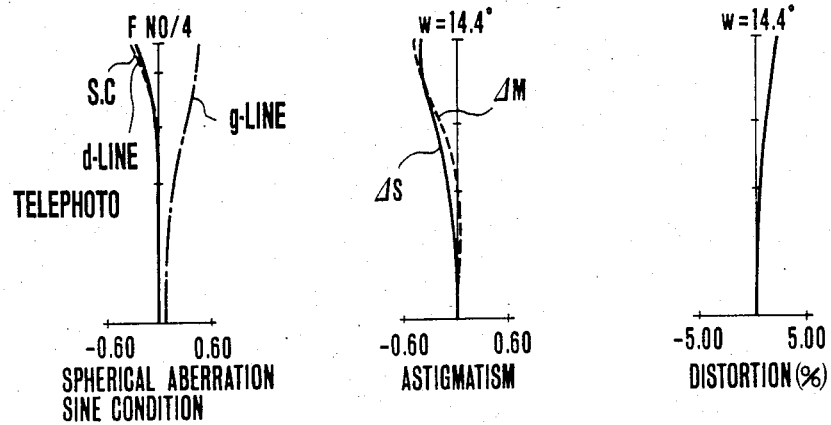
Figure 11:
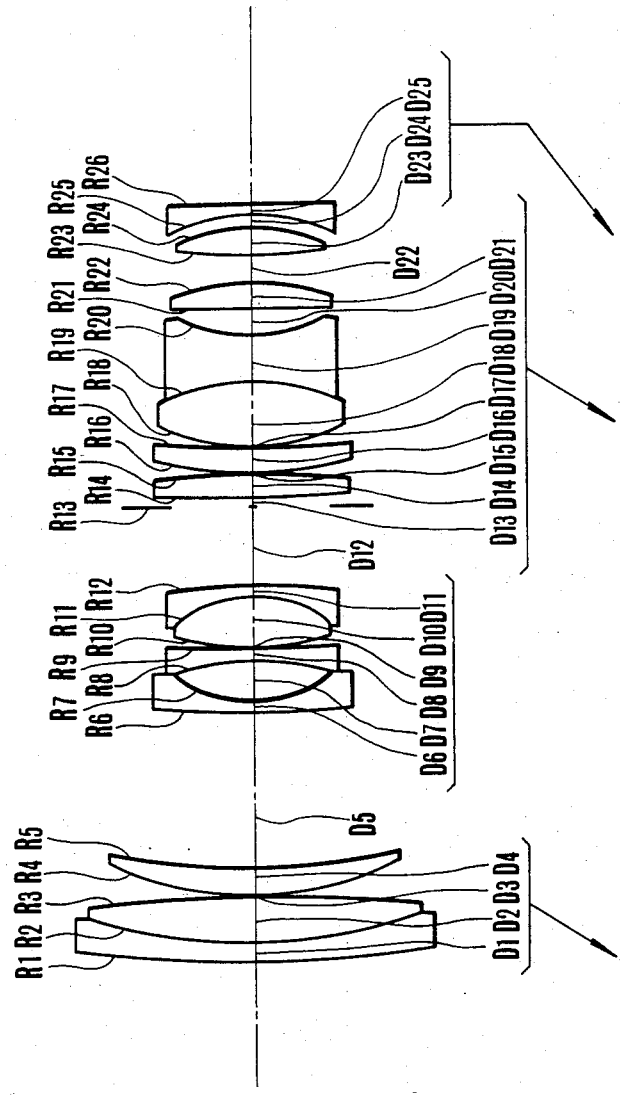
FIG. 11 is a lens block diagram of a fifth specific numerical example of the lens of the invention.
Figure 12A:
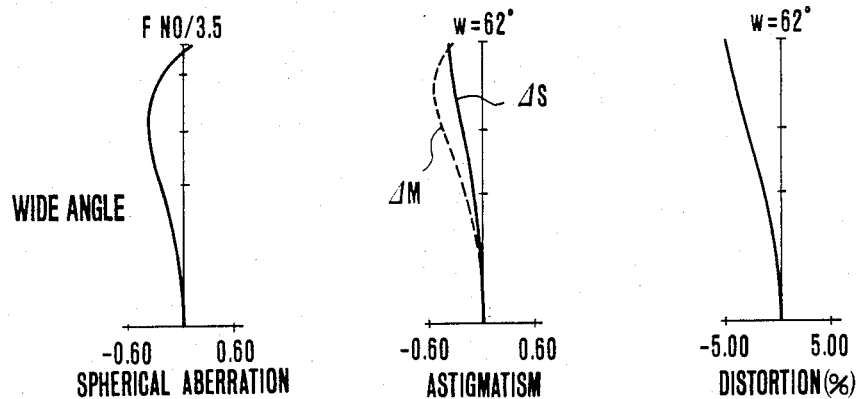
FIGS. 12(a), 12(b) and 12(c) are graphic representations of the various aberrations of the lens of FIG. 11 in the wide angle, intermediate and telephoto positions respectively.
Figure 12B:
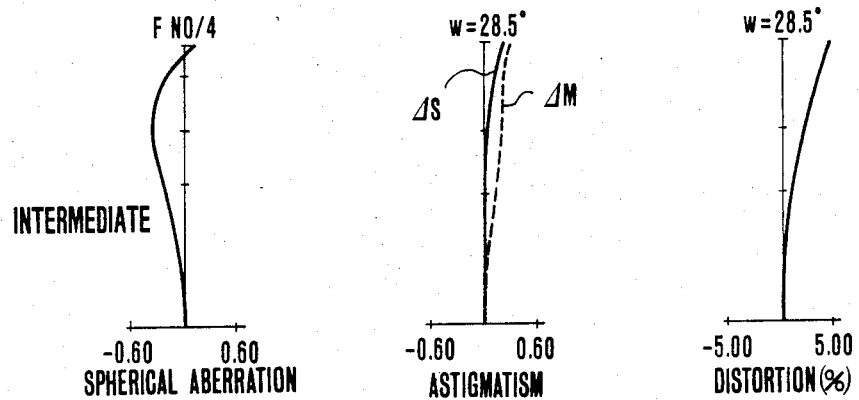
Figure 12C:
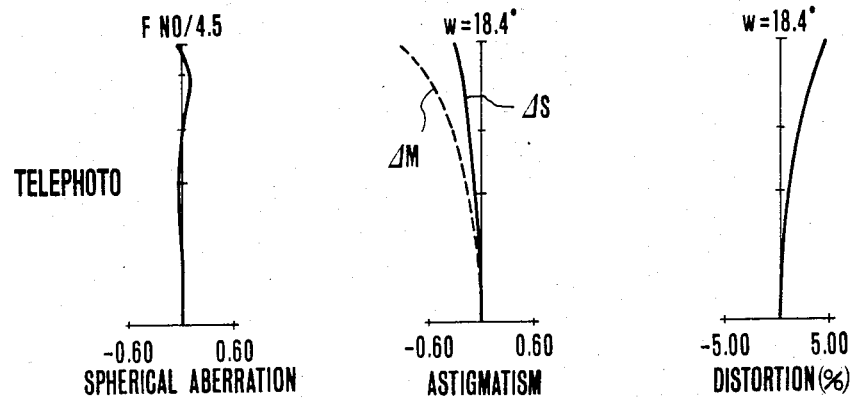

FIGS. 1 and 2 represent two different examples of the relationship of the magnifications of all the components in the wide angle position. The system of FIG. 1 disclosed, for example, in Japanese Laid-Open Patent Application Nos. SHO 56-133713, SHO 57-61804 and SHO 57-169716. FIG. 2 is an example of the power distribution of the present invention. Such comparison is made given the condition that the power distribution over the first and second components is the same.

It is to be understood from these geometric diagrams that if the convergence of the ray emerging from the third component (3 or 3') is made stronger, the back-focal distance can be shortened. Therefore, the power distribution of FIG. 2 makes it possible to shorten the entire lens system in the longitudinal direction. When applied to cameras having pivotal mirrors, such as single lens reflex cameras, there is necessarily a certain minimum limitation for the back-focal distance. The prior art power distribution of FIG. 1 requires a far longer back-focal distance than necessary. When the lower limit of condition (1) is not met, the back-focal distance is unnecessarily elongated. This is opposed to the aim of the present invention, which is to achieve an improvement in the compactness of the lens system. Conversely, when the refractive power of the third component is increased to give too strong a convergence, the back-focal distance is not sufficient to allow for pivotal movement of the mirror. In addition thereto, it becomes difficult to stabilize the aberrations produced from the third component during zooming. For these reasons, $\beta 3W$ is adjusted to a smaller value than the upper limit of condition (1).

When the limits of condition (2) are not met, the refractive powers of the third and fourth components relative to each other are limited. Condition (2), similarly to condition (1), contributes to an appropriate value for the back-focal distance and to an adequate shortening of the zoom section. In other words, by decreasing the focal length f3 of the third component in relation to the focal length f4 of the fourth component, the principal point of the combined system of the third and fourth components is shifted forward, thereby giving the advantage that room for the axial separation between the second and third components is created. This renders possible narrowing of the interval between the principal points of the second component and the combined system of the third and fourth components. As a result, for a given value of the focal length of the entire system, the positive refractive power of the combined system is strengthened. Therefore, a smaller total zooming movement effects an equivalent result in the zoom ratio, giving an additional advantage that the diameter of the front lens component is reduced. When the upper limit of condition (2) is exceeded, the above-stated advantages are diminished and it becomes difficult to provide a compact zoom lens. On the other hand, the lower limit represents the maximum of the refractive power of the fourth component in the negative sense. When the lower limit is not met, strong refractive powers of opposite sign are distributed over the third and fourth components, hindering accurate correction of aberrations with ease.

In the embodiment of the invention, the fourth component is axially movable during zooming, thereby giving the advantages that the smoothness of zoom locus of the compensator is improved, or that the fourth component may be employed as the compensator. Another advantage is correcting variation with zooming of those residual aberrations ascribable mainly to the second and third components. When the lower limit of condition (2) is not met, or the ratio of the values of f3 and f4 of opposite sign decreases, despite forming the zoom locus of the fourth component to any shape, it becomes difficult to stabilize correction of aberrations over the zooming range.

Condition (3) relates to the range of proportion of the magnification of the second component to that of the entire system. When the lower limit of condition (3) is not met, the proportion of the combined magnification of the third and fourth component is so large that variation of aberrations with zooming is objectionably increased and the diameter of the aperture opening of the diaphragm is much too large. Conversely when the upper limit is exceeded, or the proportion of the magnification of the second component is larger, it is difficult to stabilize correction of aberrations as the refractive powers of the first and second components and the total zooming movement increase an increase in the diameter of the front component is also required.

As zooming is performed from the wide angle to the telephoto position, the second component may be moved either forward or rearward. For wide angle zoom lenses, when the second component moves forward, there is the advantage that the diameter of the front members is reduced. For telephoto zoom lenses, when the second component moves rearward, there is the advantage that the diameter of the aperture opening of the diaphragm is reduced. When the second component is held stationary during zooming, it generally results that the second component takes a strongest negative refractive power, resulting in the advantage that errors in manufacturing the second component are limited to a minimum.

Focusing may be performed by the first component, counting from the front. However, the second component may be used for that purpose. It is also possible to use the third or the fourth component. It is also possible to use two or more components in combination for focusing purposes.

As has been described above, the present invention relates to three features or conditions that set forth the principle of construction of a four-component zoom lens for achieving a minimization of bulk and size and stability of aberration correction over the zooming range. It is further to be noted that the converging action that condition (1) gives the third component causes the aberrations to vary as the separation between the third and fourth components varies with zooming. This variation of the aberrations, when positively utilized, assists in improving stabilization of aberration correction.

In the zoom lens of the present invention, all components are appropriately moved to effect zooming, while simultaneously maintaining the constant position of the image plane stability of aberration correction during zooming.

Five examples of specific zoom lenses constructed in accordance with the invention have their numerical data given in the following tables for the radii of curvature, R, the axial thicknesses and separations, D, and the refractive indices, N, and the Abbe numbers, $\nu$, of the glasses of the lens elements with the subscripts numbers consecutively from front to rear.

For these examples, the numerical values of the factors in conditions (1) to (3) are listed in Table 1.

In FIGS. 3, 5, 7, 9 and 11, the arrow given to each of the components indicates the locus of the lens elements. The subscript numbers are consecutive 6, 8, 10 and 12. $\Delta M$ designates the meridional image surface and $\Delta S$ the sagittal image surface.

EXAMPLE 1

| $f = 36 \sim 101.52$ | FNO = 3.5~4.5 | Image Angle = 62° ~24.1° | |
|---|---|---|---|
| R1 = 126.567 | D1 = 2.40 | N1 = 1.80518 | $\nu$1 = 25.4 |
| R2 = 54.048 | D2 = 8.12 | N2 = 1.62299 | $\nu$2 = 58.2 |
| R3 = −212.429 | D3 = 0.10 | | |
| R4 = 36.051 | D4 = 3.97 | N3 = 1.60311 | $\nu$3 = 60.7 |
| R5 = 68.695 | D5 = Variable | | |
| R6 = 73.638 | D6 = 1.30 | N4 = 1.88300 | $\nu$4 = 40.8 |
| R7 = 15.050 | D7 = 4.54 | | |
| R8 = −33.082 | D8 = 1.20 | N5 = 1.83400 | $\nu$5 = 37.2 |
| R9 = 62.238 | D9 = 0.10 | | |
| R10 = 30.300 | D10 = 4.43 | N6 = 1.84666 | $\nu$6 = 23.9 |
| R11 = −26.310 | D11 = 1.22 | | |
| R12 = −19.835 | D12 = 1.20 | N7 = 1.83400 | $\nu$7 = 37.2 |
| R13 = −65.130 | D13 = Variable | | |
| R14 = Stop | D14 = 1.00 | | |
| R15 = 434.453 | D15 = 1.83 | N8 = 1.77250 | $\nu$8 = 49.6 |
| R16 = −135.149 | D16 = 0.10 | | |
| R17 = 49.867 | D17 = 1.88 | N9 = 1.71300 | $\nu$9 = 53.8 |
| R18 = 202.354 | D18 = 0.10 | | |
| R19 = 31.388 | D19 = 6.15 | N10 = 1.69680 | $\nu$10 = 55.5 |
| R20 = −22.350 | D20 = 1.54 | N11 = 1.80610 | $\nu$11 = 40.9 |
| R21 = 210.093 | D21 = 2.10 | | |
| R22 = 674.739 | D22 = 1.79 | N12 = 1.84666 | $\nu$12 = 23.9 |
| R23 = 29.493 | D23 = 1.20 | | |
| R24 = 382.767 | D24 = 1.78 | N13 = 1.72342 | $\nu$13 = 38.0 |
| R25 = −112.961 | D25 = 1.87 | | |
| R26 = −172.025 | D26 = 1.85 | N14 = 1.72342 | $\nu$14 = 38.0 |
| R27 = −45.510 | D27 = Variable | | |
| R28 = 888.558 | D28 = 3.09 | N15 = 1.62299 | $\nu$15 = 58.2 |
| R29 = −33.529 | D29 = 5.58 | | |
| R30 = −28.631 | D30 = 1.40 | N16 = 1.80610 | $\nu$16 = 40.9 |
| R31 = −50.991 | D31 = 43.53 | | |

| separation | f |||
|---|---|---|---|
| | f = 36 | f = 65.5 | f = 101.52 |
| D5 | 1.486 | 14.982 | 23.671 |

|   | -continued |   |   |
|---|---|---|---|
| D13 | 17.339 | 7.894 | 1.162 |
| D27 | 8 | 3.95 | 1.993 |

EXAMPLE 2

| f = 100~300 | FNO = 1:5.6 | 2ω = 24.4° ~8.2° | |
|---|---|---|---|
| R1 = 79.795 | D1 = 3.00 | N1 = 1.80518 | ν1 = 25.4 |
| R2 = 58.259 | D2 = 6.00 | N2 = 1.48749 | ν2 = 70.1 |
| R3 = 119.806 | D3 = 0.20 | | |
| R4 = 76.784 | D4 = 5.50 | N3 = 1.48749 | ν3 = 70.1 |
| R5 = −950.411 | D5 = Variable | | |
| R6 = −87.416 | D6 = 2.40 | N4 = 1.84666 | ν4 = 23.9 |
| R7 = −48.398 | D7 = 1.00 | N5 = 1.69680 | ν5 = 55.5 |
| R8 = 93.925 | D8 = 2.93 | | |
| R9 = −74.520 | D9 = 2.10 | N6 = 1.80518 | ν6 = 25.4 |
| R10 = −37.764 | D10 = 1.00 | N7 = 1.77250 | ν7 = 49.6 |
| R11 = 1739.310 | D11 = Variable | | |
| R12 = 823.111 | D12 = 5.30 | N8 = 1.49700 | ν8 = 81.6 |
| R13 = −29.040 | D13 = 2.40 | N9 = 1.84666 | ν9 = 23.9 |
| R14 = −40.282 | D14 = 0.10 | | |
| R15 = 87.761 | D15 = 3.30 | N10 = 1.48749 | ν10 = 70.1 |
| R16 = −141.455 | D16 = Variable | | |
| R17 = −39.520 | D17 = 2.50 | N11 = 1.61405 | ν11 = 55.0 |
| R18 = −193.451 | D18 = 15.21 | | |
| R19 = −407.647 | D19 = 4.00 | N12 = 1.77250 | ν12 = 49.6 |
| R20 = −49.670 | D20 = 25.60 | | |
| R21 = −31.864 | D21 = 2.00 | N13 = 1.77250 | ν13 = 49.6 |
| R22 = −36.503 | D22 = 0.10 | | |
| R23 = 227.519 | D23 = 4.00 | N14 = 1.63636 | ν14 = 35.4 |
| R24 = 73.558 | | | |

| separation | f | | |
|---|---|---|---|
| | f = 100 | f = 172 | f = 300 |
| D5 | 1.2867 | 28.9894 | 56.6921 |
| D11 | 37.0072 | 20.5100 | 4.0128 |
| D16 | 19.4382 | 27.6651 | 2.2583 |

EXAMPLE 3

| f = 50~150 | FNO = 1:4.1 | 2ω = 46.8° ~16.4° | |
|---|---|---|---|
| R1 = 228.788 | D1 = 2.86 | N1 = 1.80518 | ν1 = 25.4 |
| R2 = 74.185 | D2 = 6.77 | N2 = 1.62299 | ν2 = 58.2 |
| R3 = −865.877 | D3 = 0.15 | | |
| R4 = 50.118 | D4 = 6.43 | N3 = 1.61117 | ν3 = 55.9 |
| R5 = 207.889 | D5 = Variable | | |
| R6 = 127.402 | D6 = 1.80 | N4 = 1.88300 | ν4 = 40.8 |
| R7 = 23.253 | D7 = 6.67 | | |
| R8 = −72.016 | D8 = 1.50 | N5 = 1.83400 | ν5 = 37.2 |
| R9 = 70.019 | D9 = 1.93 | | |
| R10 = 45.551 | D10 = 4.39 | N6 = 1.84666 | ν6 = 23.9 |
| R11 = −45.270 | D11 = 1.63 | | |
| R12 = −35.380 | D12 = 1.30 | N7 = 1.83400 | ν7 = 37.2 |
| R13 = −236.298 | D13 = Variable | | |
| R14 = 75.500 | D14 = 2.73 | N8 = 1.61484 | ν8 = 51.2 |
| R15 = −267.791 | D15 = 0.15 | | |
| R16 = 48.745 | D16 = 2.52 | N9 = 1.61484 | ν9 = 51.2 |
| R17 = 150.175 | D17 = 0.15 | | |
| R18 = 32.305 | D18 = 2.27 | N10 = 1.61293 | ν10 = 37.0 |
| R19 = 52.021 | D19 = 0.15 | | |
| R20 = 24.694 | D20 = 6.22 | N11 = 1.51742 | ν11 = 52.4 |
| R21 = −220.795 | D21 = 6.57 | N12 = 1.84666 | ν12 = 23.9 |
| R22 = 18.252 | D22 = 4.49 | | |
| R23 = 142.796 | D23 = 2.64 | N13 = 1.58215 | ν13 = 42.1 |
| R24 = −40.133 | D24 = Variable | | |
| R25 = −49.640 | D25 = 1.40 | N14 = 1.65830 | ν14 = 53.4 |
| R26 = 136.207 | D26 = 3.05 | N15 = 1.80610 | ν15 = 40.9 |
| R27 = −100.624 | | | |

| separation | f | | |
|---|---|---|---|
| | f = 50 | f = 100 | f = 150 |
| D5 | 2.2983 | 21.2566 | 31.4650 |
| D13 | 26.4984 | 10.0526 | 1.1971 |
| D24 | 16.5886 | 16.6232 | 2.4694 |

EXAMPLE 4

| f = 29.2~84.1 | FNO = 1:4 | Image Angle = 73.1° ~28.9° | |
|---|---|---|---|
| R1 = 115.078 | D1 = 2.00 | N1 = 1.80518 | ν1 = 25.4 |
| R2 = 47.832 | D2 = 1.70 | | |
| R3 = 56.028 | D3 = 8.50 | N2 = 1.65844 | ν2 = 50.9 |
| R4 = 310.840 | D4 = 0.10 | | |
| R5 = 40.625 | D5 = 8.00 | N3 = 1.69680 | ν3 = 55.5 |
| R6 = 362.284 | D6 = Variable | | |
| R7 = 151.116 | D7 = 1.10 | N4 = 1.88300 | ν4 = 40.8 |
| R8 = 14.907 | D8 = 4.20 | | |
| R9 = −61.032 | D9 = 3.40 | N5 = 1.80518 | ν5 = 25.4 |
| R10 = −14.342 | D10 = 1.00 | N6 = 1.86300 | ν6 = 41.5 |
| R11 = 143.371 | D11 = 1.84 | | |
| R12 = 31.333 | D12 = 3.00 | N7 = 1.84666 | ν7 = 23.9 |
| R13 = 68.144 | D13 = Variable | | |
| R14 = 111.716 | D14 = 2.50 | N8 = 1.65844 | ν8 = 50.9 |
| R15 = −62.708 | D15 = 0.09 | | |
| R16 = 37.955 | D16 = 2.00 | N9 = 1.72342 | ν9 = 38.0 |
| R17 = 199.391 | D17 = 0.09 | | |
| R18 = 17.971 | D18 = 5.86 | N10 = 1.51742 | ν10 = 52.4 |
| R19 = −112.023 | D19 = 4.65 | N11 = 1.84666 | ν11 = 23.9 |
| R20 = 15.395 | D20 = 2.20 | | |
| R21 = −164.076 | D21 = 2.61 | N12 = 1.67003 | ν12 = 47.3 |
| R22 = −33.457 | D22 = Variable | | |
| R23 = −38.543 | D23 = 1.00 | N13 = 1.77250 | ν13 = 49.6 |
| R24 = 60.111 | D24 = 3.40 | N14 = 1.51742 | ν14 = 52.4 |
| R25 = −56.694 | D25 = 0.10 | | |
| R26 = 73.843 | D26 = 6.00 | N15 = 1.56883 | ν15 = 56.3 |
| R27 = −20.682 | D27 = 1.00 | N16 = 1.72916 | ν16 = 54.7 |
| R28 = −28.845 | | | |

| separation | f | | |
|---|---|---|---|
| | f = 29.2 | f = 54 | f = 84.1 |
| D6 | 1.792 | 13.143 | 20.845 |
| D13 | 17.096 | 8.456 | 2.696 |
| D22 | 1.223 | 6.563 | 10.123 |

EXAMPLE 5

| f = 36.0~133.4 | FNO = 1:3.5~4.5 | 2ω = 62° ~18.4° | |
|---|---|---|---|
| R1 = 192.581 | D1 = 2.50 | N1 = 1.80518 | ν1 = 25.4 |
| R2 = 71.822 | D2 = 6.18 | N2 = 1.58913 | ν2 = 61.0 |
| R3 = −174.311 | D3 = 0.10 | | |
| R4 = 42.926 | D4 = 3.86 | N3 = 1.62299 | ν3 = 58.2 |
| R5 = 111.308 | D5 = Variable | | |
| R6 = 137.016 | D6 = 1.40 | N4 = 1.88300 | ν4 = 40.8 |
| R7 = 16.787 | D7 = 5.68 | | |
| R8 = −31.858 | D8 = 1.53 | N5 = 1.78590 | ν5 = 44.2 |
| R9 = 251.319 | D9 = 0.10 | | |
| R10 = 38.134 | D10 = 7.06 | N6 = 1.72825 | ν6 = 28.5 |
| R11 = −14.903 | D11 = 1.30 | N7 = 1.83400 | ν7 = 37.2 |
| R12 = −71.956 | D12 = Variable | | |
| R13 = Stop | D13 = 1.00 | | |
| R14 = 138.790 | D14 = 3.37 | N8 = 1.69680 | ν8 = 55.5 |
| R15 = −114.582 | D15 = 0.10 | | |
| R16 = 53.085 | D16 = 3.17 | N9 = 1.69680 | ν9 = 55.5 |
| R17 = 150.399 | D17 = 0.10 | | |
| R18 = 27.121 | D18 = 8.70 | N10 = 1.69680 | ν10 = 55.5 |
| R19 = −27.666 | D19 = 6.09 | N11 = 1.85026 | ν11 = 32.3 |
| R20 = 22.938 | D20 = 3.48 | | |
| R21 = −587.464 | D21 = 3.24 | N12 = 1.72342 | ν12 = 38.0 |
| R22 = −34.510 | D22 = Variable | | |
| R23 = 87.735 | D23 = 3.55 | N13 = 1.54072 | ν13 = 47.2 |
| R24 = −23.498 | D24 = 1.69 | | |
| R25 = −23.707 | D25 = 1.40 | N14 = 1.83481 | ν14 = 42.7 |
| R26 = −449.648 | | | |

| separation | f | | |
|---|---|---|---|
| | f = 36.0 | f = 85.1 | f = 133.4 |
| D5 | 1.612 | 18.432 | 27.964 |
| D12 | 25.569 | 10.569 | 2.069 |
| D22 | 8.0 | 3.800 | 1.420 |

TABLE 1

| Factor | Example 1 | Example 2 | Example 3 | Example 4 | Example 5 |
|---|---|---|---|---|---|
| $-3 < \beta 3W < -0.2$ | −2.24 | −1.0 | −0.9 | −2.03 | −1.06 |
| $-0.35 < f3/f4 < 0.45$ | 0.32 | −0.25 | −0.15 | 0.40 | −0.09 |
| $0.45 < Z2/Z \leqq 1.0$ | 0.72 | 1.0 | 0.74 | 0.65 | 0.62 |

What we claim:

1. A zoom lens comprising,
   from front to rear, a positive first lens component, a negative second lens component, a positive third lens component and a fourth lens component,
   said first, third and fourth lens components being movable during zooming,
   said zoom lens satisfying the following conditions:
   $-3 < \beta 3W < -0.2$
   $-0.35 < f3/f4 < 0.45$
   $0.45 < Z2/Z \leqq 1$
   wherein $\beta 3W$ is the image magnification of said third lens component in the wide angle position, f3 and f4 are the focal lengths of said third and said fourth lens components respectively, Z is the zoom ratio of the entire system, and Z2 is that fraction of the zoom ratio which said second lens component assumes.

2. A zoom lens according to claim 1, wherein said second lens component is movable during zooming.

3. A zoom lens according to claim 1, wherein said second lens component is held stationary during zooming.

4. A zoom lens comprising,
   from front to rear, a positive first lens component, a negative second lens component, a positive third lens component and a fourth lens component,
   said first, third and fourth lens components being movable during zooming,
   said zoom lens satisfying the following conditions:
   $-3 < \beta 3W < -0.2$
   $-0.35 < f3/f4 < 0.45$
   $0.45 < Z2/Z \leqq 1$
   wherein $\beta 3W$ is the image magnification of said third lens component in the wide angle position, f3 and f4 are the focal lengths of said third and said fourth lens components respectively, Z is the zoom ratio of the entire system, and Z2 is that fraction of the zoom ratio which said second lens component assumes said fourth lens component being negative.

* * * * *